United States Patent [19]
Tzeng

[11] Patent Number: 5,132,829
[45] Date of Patent: Jul. 21, 1992

[54] TONE SPACING AND POWER LEVEL MONITOR FOR FSK LIGHTWAVE SYSTEMS

[75] Inventor: Liang D. Tzeng, Fogelsville, Pa.

[73] Assignee: Bell Telephone Laboratories Inc., Murray Hill, N.J.

[21] Appl. No.: 452,082

[22] Filed: Dec. 18, 1989

[51] Int. Cl.$^5$ ............................................ H04B 10/04
[52] U.S. Cl. .................................... 359/187; 359/192
[58] Field of Search ...................... 455/617, 619, 618; 359/187, 192

[56] References Cited

U.S. PATENT DOCUMENTS

| | | | |
|---|---|---|---|
| 3,947,769 | 3/1976 | Rousos et al. | 325/320 |
| 4,056,838 | 11/1977 | Leib | 361/68 |
| 4,700,352 | 10/1987 | Shikada et al. | 372/20 |
| 4,759,080 | 7/1988 | Emura et al. | 455/617 |
| 5,003,626 | 3/1991 | Kawahara | 455/619 |

FOREIGN PATENT DOCUMENTS 0337644 10/1989 PCT Int'l Appl. ..................... 370/1

OTHER PUBLICATIONS

Hodgkinson et al., "Polarization Insensitive Heterodyne Detection Using Polarization Scrambling", 6th International Conference on Integrated Optics and Optical Fiber, Jan. 19-22, 1987.

Hodgkinson et al., "Polarization Insensitive Heterodyne Detection Using Polarization Scrambling", Electronic Letters, May 7, 1987, vol. 23, #10, pp. 513-514.

Hodgkinson et al., "Demodulation of Optical DPSK Using in Phase and Quadrature Detection" Electronics Letters, Sep. 12, 1985, vol. 21, #19, pp. 867-868.

Primary Examiner—Edward L. Coles, Sr.
Assistant Examiner—L. Pascal

[57] ABSTRACT

Apparatus and method are disclosed for controlling the tone spacing ($2\omega_d$) and output power level in an FSK lightwave transmitter. An arrangement is utilized which splits a tapped-off portion of the output data stream into two essentially equal components. A first component is then delayed and scrambled (polarization state) with respect to the second component. Self-heterodyning of the two signals results in forming a signal at the beat frequency, or tone spacing value. By comparing this beat frequency with a predetermined tone spacing value, adjustments may be made to the transmitter to maintain the desired tone spacing value. The self-heterodyned signal will also contain a component indicative of the data signal power level and may be utilized to adjust the transmitting device so as to maintain a constant power.

24 Claims, 2 Drawing Sheets

TONE SPACING AND POWER LEVEL MONITOR FOR FSK LIGHTWAVE SYSTEMS

BACKGROUND OF THE INVENTION

1. Field of the Invention

The present invention relates to a tone spacing and power level monitoring arrangement for FSK lightwave systems and, more particularly, to a polarization-independent, fiber-based monitoring system which utilizes a self-heterodyning technique.

2. Description of the Prior Art

In FSK (frequency-shift-keyed) transmission systems, the carrier frequency $\omega_s$ is modulated by a binary data stream such that the carrier frequency shifts between two distinct values related to a transmitted logic 0 ($\omega_s - \omega_d$) and and a transmitted logic 1 ($\omega + \omega_d$). Tone spacing (also referred to in the art as frequency-shift spacing) is defined as the difference (i.e., $2\omega_d$) between these two transmitted frequencies. In conventional microwave electronic FSK systems, tone-spacing will remain relatively constant. However, in lightwave FSK systems, the carrier frequency may experience drift in response to a number of factors, including temperature, age, and data rate. Therefore, the tone spacing in lightwave FSK systems may also drift. The performance of the receiver in lightwave FSK systems, in terms of recovering the transmitted data signal, may then be affected by any change in tone spacing.

One prior art technique for providing control of tone spacing is disclosed in U.S. Pat. No. 4,700,352, issued to M. Shikada et al. on Oct. 13, 1987. As described therein, a self-heterodyne technique is used to extract the beat frequency between the transmitted signal and a delayed version thereof. The beat frequency corresponds to the tone spacing value and, therefore, any variation from the desired tone spacing value will result in a change in beat frequency. This change in beat frequency is translated into an error signal which is then passed back to the transmitting device. Adjustments in operating parameters (e.g., bias current, operating temperature) are then made to the laser until the beat frequency and predetermined tone spacing are essentially identical.

Although the Shikada et al. arrangement seems feasible in theory, in application there exist a number of drawbacks. Firstly, as disclosed, Shikada et al. require the use of polarization-maintaining components (fiber, splitter, coupler) to perform the self-heterodyning operation, where such components are not considered as practical alternatives at this point in time. Additionally, Shikada et al. require precise control of the signal delay such that the input lightwave signal is shifted exactly one bit (or two bits in an alternative embodiment). The ability to control such a precise delay is uncertain and further limits the use of the device to a set data rate. That is, any change in the transmitter data rate would necessitate a comparable change in the length of delay in the tone-spacing control arrangement.

Therefore, a need remains in the prior art for a means of controlling the tone-spacing in lightwave FSK systems which is relatively robust and is neither polarization nor data rate dependent.

SUMMARY OF THE INVENTION

The need remaining in the prior art is addressed by the present invention which relates to a tone spacing and power level monitoring arrangement for lightwave FSK transmitters and, more particularly, to a polarization-independent fiber-based, monitor which utilizes self-heterodyning techniques to control tone spacing.

In accordance with one embodiment of the present invention, a small fraction S of the FSK output signal D is passed through a fiber-based self-heterodyne arrangement which performs the following functions: (1) divides signal S into two equal (in terms of power) components $S_1$ and $S_2$; (2) delays $S_1$ with respect to $S_2$; (3) scrambles the polarization state of $S_1$; (4) combines the delayed and scrambled $S_1$ with $S_2$; and (5) converts the optical combination into an electrical representation. Steps (2)–(4) outlined above are defined herein as the "self-heterodyning" operation. The output from the receiver is then electrically filtered so as to pass only signals around the desired tone spacing value (e.g., $2\omega_d$), defined as the beat frequency. By comparing the filter output with a predetermined value for the tone spacing ($\omega_{ts}$), an error signal $\epsilon_{ts}$ representative of their difference may be fed back to the transmitter for tone spacing correction at the modulation source.

It is an advantage of the present invention that the delay utilized in step (2) outlined above is random in nature, where it is desired that the two signals (delayed $S_1$ and $S_2$) be uncorrelated (incoherent). One prior art arrangement, in comparison, uses a one-bit delay, which during long runs of transmitted 1's or 0's results in a large amount (degree) of coherence which may virtually eliminate any beat frequency component. In general, the greater the incoherence, the more likely a beat frequency component will be generated.

Another advantage of the present invention is that the polarization state of the signal $S_1$ is scrambled so that the sensitivity of the receiver circuitry to the polarization state of the signal is minimized. In contrast, prior art techniques attempted to carefully control the polarization state of both signals using various polarization-maintaining components, which, at present, are expensive to manufacture.

A further advantage of the present invention is that the power level of the FSK output signal may also be derived from the output of the tone spacing control arrangement. Adjustments in the output power level of the laser may then be made accordingly.

Other and further advantages of the present invention will become apparent during the course of the following discussion and by reference to the accompanying drawings.

BRIEF DESCRIPTION OF THE DRAWING

Referring now to the drawings.

DETAILED DESCRIPTION

Figure 1:
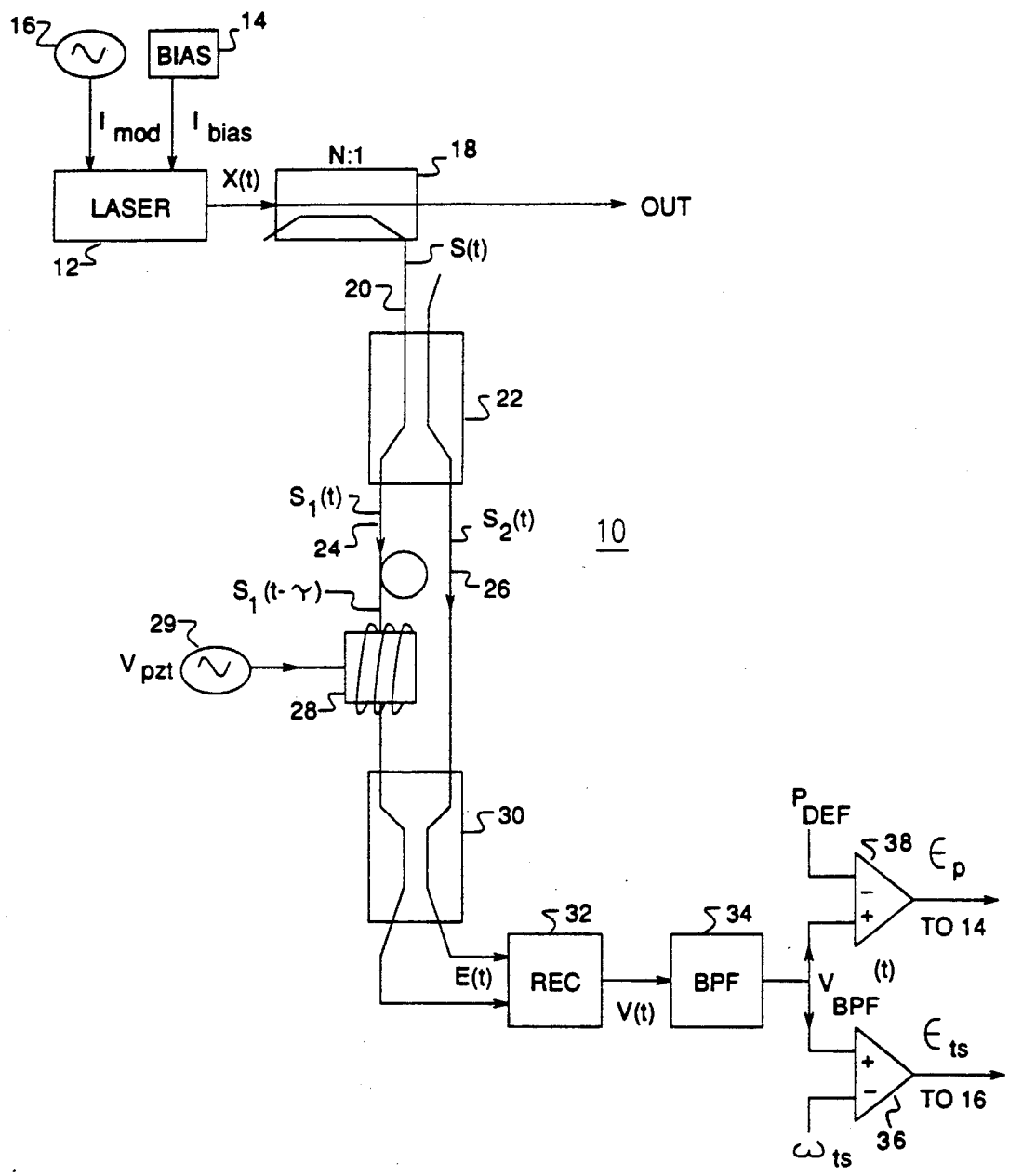
FIG. 1 illustrates an exemplary tone spacing and power level monitor arrangement formed in accordance with the present invention.

FIG. 1 illustrates an FSK laser transmitter utilizing an exemplary tone spacing controlling arrangement 10 of the present invention. As shown, an FSK transmitter includes a laser 12, coupled to a bias current source 14 and data source 16. As is well-known in the art, the application of a predetermined bias current $I_{bias}$ to laser 12 produces an output signal at a carrier frequency $\omega_s$. The superposition of a modulation current at a frequency ($\omega_s + D(t)\omega_d$), representative of a data stream X(t) from source 16, will cause carrier frequency $\omega_s$ to vary between values of $\omega_s+\omega_d$ (for binary data "1"), and $\omega_s-\omega_d$ (for binary data "0"). As mentioned above, control of the tone spacing $2\omega_d$ is critical in recovering the transmitted data stream D(t) within an acceptable bit error rate.

Referring back to FIG. 1, arrangement 10 of the present invention utilizes a relatively small portion S(t) of the output data signal X(t), portion S(t) being tapped from X(t) using a splitter 18, where splitter 18 may be a 10:1 splitter, or any other suitable device which removes only a small portion of the output signal from the path. Various arrangements for forming such a splitter include fiber-based splitters (fibers fused together with their core regions carefully controlled to yield the desired splitting ratio), or waveguide devices (e.g, Ti-diffused waveguides formed in $LiNbO_3$ substrates). Alternatively, since a portion of light will also exit the backface of laser 12, this signal may be used as input signal S(t) to controller 10 (as illustrated in phantom in FIG. 1), without disturbing the actual output data signal X(t). In general, for an FSK system, signal S(t) may be defined by the following relation:

$$s(t) = P_s cos([\omega_s + D(t)\omega_d]t),$$

where $P_s$ is defined as the power level of signal S(t), and D(t) varies between the values of $+1$ for a binary data "1" and $-1$ for binary data "0".

Lightwave signal S(t), as shown in FIG. 1, propagates along a first section 20 of optical waveguide and is coupled into a splitter 22 which functions to separate signal S(t) into two components, $S_1(t)$ and $S_2(t)$, of relatively equal power. A 3dB coupler/splitter, for example, is well-known in the art for performing this function. In particular, a standard fused fiber coupler will, unless otherwise modified, yield an even split between the two output fibers. Alternatively, optical substrate-based splitters may be used. At the output of splitter 22, component $S_1(t)$ may be represented by the following relation:

$$S_1(t) = (\sqrt{x}\ \hat{E} + \sqrt{1-x}\ \hat{O})\sqrt{P_s}\ cos([\omega_s + D(t)\omega_d]t).$$

The terms $\hat{E}$ and $\hat{O}$ denote the two orthogonal states of polarization (referred to in the art as the e̱xtraorindary and o̱rdinary states, respectively), and x represents the portion of component $S_1(t)$ having the $\hat{E}$ polarization. Similarly, component $S_2(t)$ may be represented as follows:

$$S_2(t) = (\sqrt{y}\ \hat{E} + \sqrt{1-y}\ \hat{O})\sqrt{P_s}\ cos([\omega_s D(t)\omega_d]t),$$

where y represents the portion of component $S_2(t)$ having the $\hat{E}$ polarization. As shown in FIG. 1, components $S_1(t)$ and $S_2(t)$ are coupled into optical fibers 24 and 26, respectively. Subsequent to the splitting operation, first components $S_1(t)$ is delayed by an amount $\tau$ with respect to $S_2(t)$, where this delay may simply be provided by utilizing a fiber 24 which is longer than fiber 26. The purpose of this delay is to insure that signals $S_1(t-\tau)$ and $S_2(t)$ are uncorrelated such that their heterodyning will provide the tone spacing value as their beat frequency. As discussed above, the exact length of this delay is not critical and can, in fact, even vary as a function of time. The only requirement is that the delay be greater than the coherence length of the laser output (the coherence length is determined by the linewidth of the laser output. The wider the linewidth, the shorter the coherence length).

Subsequent to forming $S_1(t-\tau)$, the polarization state of $S_1(t-\tau)$ is scrambled utilizing a polarization scrambling arrangement. One exemplary polarization scrambling arrangement, illustrated in FIG. 1, comprises a piezoelectric transducer (PZT) 28 coupled to a low frequency signal source 29. As is well-known in the art, PZT 28 includes a ceramic material which will change in physical size as a function of the impressed electric field. Therefore, the application of a signal $V_{PZT}$ will result in changing the size of PZT member 28. In the application of the present invention, polarization scrambling is achieved by winding fiber 24 around PZT 28 such that changes in size of member 28 will result in a stress-induced change in birefringence of fiber 24, thus altering the polarization state of any signal passing therethrough. Therefore, delayed signal component $S_1(t-\tau)$ will be further modified by arrangement 28 to comprise an unknown (and possibly time-varying) polarization state. It may be assumed for present purposes that the scrambling is sufficient to allow for the simplification that either polarization state $\hat{E}$ or $\hat{O}$ is equally likely to occur. Therefore, the terms x and $1-x$ may each be replaced by $\frac{1}{2}$. The delayed and scrambled component $S_1$ may then be represented as follows:

$$<S_1(t-\tau)> = (\sqrt{1/2}\ \hat{E} + \sqrt{1/2}\ \hat{O})\sqrt{P_s}\ cos([\omega_s + D(t-\tau)\omega_d](t-\tau)),$$

where the symbols $<>$ indicate the probability of the specified quantity. It is to be noted that the utilization of PZT 28 to perform the polarization scrambling function also serves the purpose of delaying $S_1(t)$ with respect to $S_2(t)$, since a longer section of fiber 24 will be required to wind around PZT 28. Therefore, in this particular embodiment, the use of a separate delaying loop in fiber 24 is not required.

Delayed and scrambled $<S_1(t-\tau)>$ is then recombined with signal $S_2(t)$, as shown in FIG. 1, using a coupler 30 to produce as an output a signal E(t) (in actuality, a pair of signals) representative of the sum of the two components. Since the two polarization states are independent, the coefficients for each may be separately summed and the resultant E(t) represented as follows:

$$E(t) = [\sqrt{1/2}\ \sqrt{P_s}\ cos\theta_1 + \sqrt{y}\ \sqrt{P_s}\ cos\theta_2]\hat{E} + [\sqrt{1/2}\ \sqrt{P_s}\ cos\theta_1 + \sqrt{1-y}\ \sqrt{P_s}\ cos\theta_2]\hat{O},$$

the terms $\theta_1$ and $\theta_2$ being used as defining the cosine functions as used above, with $\theta_1$ referring to signal $S_1$ and $\theta_2$ referring to signal $S_2$. The sum signal E(t), as seen in FIG. 1, is subsequently applied as the input to receiver 32. In one embodiment, receiver 32 may be a PIN-FET balanced receiver. Alternatively, a single-sided receiver may be used, since the two output signals from coupler 30 will be essentially identical.

The output signal from receiver 32 will thus be a voltage representative of the input applied thereto. Since the input signal E(t) is representative of the optical power of the self-heterodyned signal, the voltage output from receiver 32, denoted V(t), will be proportional to $E(t)^2$. The squaring of the relation for E(t) results in a voltage signal with a number of $\cos^2\theta$ and $\cos\theta_1\cos\theta_2$ terms.

In accordance with the teachings of the present invention, the tone spacing information will be found in the $\cos\theta_1\cos\theta_2$ terms. Since this function may be rewritten as $\cos(\theta_1-\theta_2)$, with $\theta_1$ related to the delayed value $(t-\tau)$, all common terms (e.g., $\omega_s$) will disappear. Therefore, the output from receiver 32 may be simplified to the following:

$$V(t) = (\tfrac{1}{2}P_s)<\cos([D(t)-D(t-\tau)]\omega_d t)>.$$

Since the quantity $[D(t)-D(t-\tau)]$ may have only the values of "2" or "0", a bandpass filter 34 may be configured to remove the "0" (e.g., DC) component and provide as an output the following signal:

$$V_{BPF}(t) = \tfrac{1}{2}P_s\cos(2\omega_d t).$$

The term $2\omega_d$, as discussed above, is the defined tone spacing value. Therefore, by comparing this derived value with a predetermined fixed tone spacing, denoted $\omega_{ts}$, the difference may be used as an error signal indicating a drift in the actual (derived) tone spacing from the desired value. In particular, as shown in FIG. 1, tone spacing control is achieved in accordance with the present invention by using a frequency discriminator 36. The details of such a device are well-known in the art and need not be discussed here. In general, the output voltage of a frequency discriminator is known to be proportional to the different between the input signal frequency (e.g., $2\omega_d$) and a predetermined frequency value (e.g., $\omega_{ts}$). Frequency discriminator 36 thus provides a positive output voltage $(+\epsilon_{ts})$ when $2\omega_d$ is greater than $\omega_{ts}$ and, similarly, discriminator 36 provides a negative output voltage $(-\epsilon_{ts})$ when $2\omega_d$ is less than $\omega_{ts}$. The output error voltage $\epsilon_{ts}$ is subsequently sent back as a control signal to modulation source 16 for correction of the tone spacing.

As shown in FIG. 1, the output from bandpass filter 34 is also applied as an input to a power detector 38. Since the term $P_s$ also appears in the filtered output signal $V_{BPF}(t)$, the power level of data signal D may also be monitored. Simply, $P_s$ may be compared to a predetermined power level $P_{DEF}$ in a comparator 38, where any difference between the two values results in the generation of a control signal $\epsilon p$. Control signal $\epsilon p$ may then be coupled back to the bias source 14 so as to modify the bias current $I_{bias}$ and maintain a constant power level. In the extreme, the power monitoring arrangement will also be able to detect complete loss of signal $(P_s=0)$.

Figure 2:
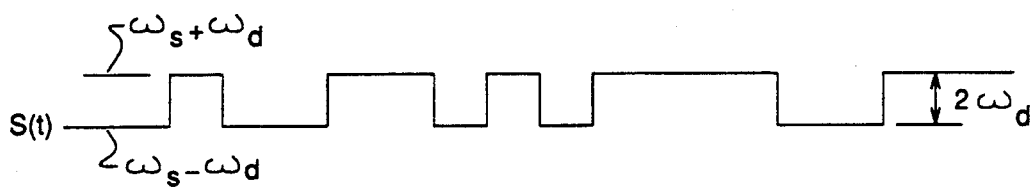
FIG. 2 contains a series of timing diagrams illustrating the various signals present within the arrangement of FIG. 1.
Figure 2:
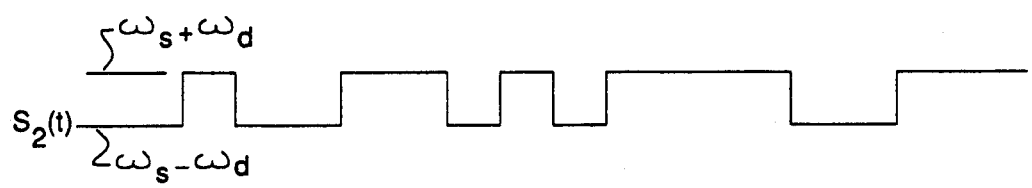
Figure 2:
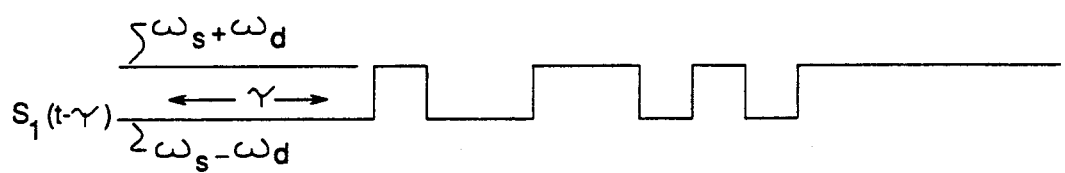
Figure 2:
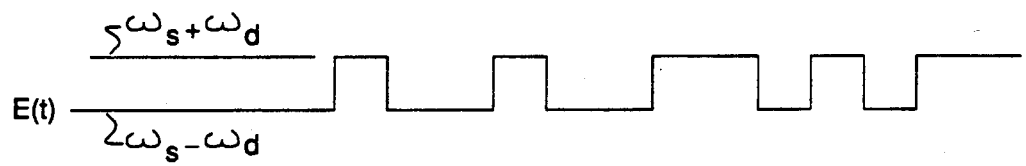

FIG. 2 contains a number of timing diagrams illustrating various signals formed during the operation of controller 10 of the present invention. As seen, input signal S(t) to controller 10 consists of a predetermined data stream of 1's and 0's, as represented by the frequencies $\omega_s+\omega_d$ and $\omega_s-\omega_d$, respectively. Signal $S_2(t)$ is also shown in FIG. 2 and will be essentially identical to the incoming signal S. As discussed above, signal $S_1(t)$ is delayed for a time period $\tau$ with respect to $S_2(t)$, where $\tau$ may be any time period greater than the coherence length of the laser source. Delayed signal $S_1(t-\tau)$ is illustrated in FIG. 2 for a random delay $\tau$. As illustrated, $\tau$ is a fixed amount. However, as discussed above, the delay $\tau$ may also vary as a function of time without affecting the performance of controller 10 of the present invention. Signal E(t), which represents the combination of $S_2(t)$ and $<S_1(t-\tau)>$ is also shown in FIG. 2. As seen, by virtue of the self-heterodyning operation, the sum of $S_2(t)$ and $S_1(t-\tau)$ results in a signal which varies between 0 (for D(t) of each being equal) and the tone spacing value of $2\omega_d$ (for D(t) of each being unequal). The random nature of the delay $\tau$ insures the occurrence this signal.

What is claimed is:

1. A method of controlling tone spacing in the output data signal D of an FSK lightwave transmitter, tone spacing being defined as the difference in frequency between a transmitted first logic signal at a first frequency $\omega_s+\omega_d$ and a transmitted second logic signal at a second frequency $\omega_s-\omega_d$, the method comprising the steps of:
   a) obtaining a lightwave signal S representative of the output data signal D;
   b) splitting signal S into two components $S_1$ and $S_2$ with essentially equal power;
   c) self-heterodyning components $S_1$ and $S_2$ to generate a randomly polarized signal having a component at the non-zero frequency value $2\omega_d$;
   d) comparing the non-zero frequency value $2\omega_d$ from step c) to a predetermined tone spacing value $\omega_{ts}$; and
   e) adjusting an operating parameter of the lightwave transmitter to maintain the non-zero frequency value of step c) essentially identical to the predetermined tone spacing value $\omega_{ts}$.

2. The method according to claim 1 wherein in performing step a), the output signal S is obtained by tapping off a portion of the output data signal D.

3. The method according to claim 2 wherein a fused fiber coupler with a predetermined splitting ratio of N:1 is sued to tap off a portion of output data signal D.

4. The method according to claim 3 wherein N is approximately equal to 10.

5. The method according to claim 1 wherein in performing step a), the output signal S is directly obtained from the FSK lightwave transmitter.

6. The method according to claim 1 wherein in performing step c), the following steps are performed:
   $c_1$) delaying component $S_1$ for a time period $\tau$ with respect to $S_2$;
   $c_2$) scrambling the polarization state of delayed component $S_1$;
   $c_3$) combining scrambled and delayed component $S_1$ with $S_2$ to form a randomly polarized signal E(t) representative of the sum thereof.

7. The method according to claim 6 wherein the self-heterodyning operation comprises the further step of:
   $c_4$) converting the randomly polarized signal E(t) of step $c_3$ into an electrical representation thereof, V(t), including components at the non-zero frequency of $2\omega_d$.

8. The method according to claim 7 wherein the self-heterodyning operation comprises the further step of:
   $c_5$) filtering the electrical representation V(t) to remove components at frequencies other than $2\omega_d$.

9. The method according to claim 6 wherein in performing steps b) and $c_3$) fused fiber elements are utilized to perform the splitting and combining functions.

10. The method according to claim 6 wherein in performing steps b) and c3) optical waveguide components are utilized to perform the splitting and combining functions.

11. The method according to claim 6 wherein in performing step c1), a section of optical fiber is utilized to perform the delaying function.

12. The method according to claim 6 wherein in performing step c2), a piezoelectric transducer is used to perform the polarization scrambling operation.

13. The method according to claim 6 wherein in performing step c3), a balanced receiver is used to provide the combining function.

14. The method according to claim 13 wherein the receiver comprises a PIN-FET balanced receiver.

15. In an FSK lightwave transmitter, an arrangement for controlling the tone spacing $2\omega_d$ between a first transmitted logic signal at a first frequency $\omega_s+\omega_d$ and a second transmitted logic signal at a second frequency $\omega_s-\omega_d$, the arrangement comprising;

means for splitting a signal S representative of the output data signal D into two essentially equal components $S_1$ and $S_2$;

means for performing a self-heterodyning operation between components $S_1$ and $S_2$ and generating as an output a randomly polarized signal with a components at the non-zero frequency $2\omega_d$; and a comparator coupled to the output of the self-heterodyning means for comparing the non-zero frequency value $2\omega_d$ to a predetermined tone spacing value $\omega_{ts}$ and providing as an output an error signal $\epsilon_{ts}$ indicative of the difference between the inputs, the error signal being applied as an input correcting signal to the FSK lightwave transmitter.

16. The arrangement of claim 15 wherein the splitting means comprises a fused fiber coupler.

17. The arrangement of claim 15 wherein the splitting means comprises an integrated optical waveguide component.

18. The arrangement of claim 15 wherein the self-heterodyning means comprises means for delaying the first component $S_1$ with respect to the second component $S_2$;

means for scrambling the polarization state of the first component $S_1$;

means for combining the delayed and scrambled $S_1$ with $S_2$ and providing as an output a randomly polarized signal E(t) representative of their sum.

19. The arrangement of claim 18 wherein the self-heterodyning means further comprises receiving means responsive to the sum signal E(t) for providing as an output an electrical representation V(t) of signal E(t), electrical signal V(t) containing components at the non-zero frequency value $2\omega_d$.

20. The arrangement of claim 19 wherein the self-heterodyning means further comprises filtering means coupled to the output of the receiving means for removing components of signal V(t) at frequencies other than $2\omega_d$.

21. The arrangement of claim 18 wherein the delaying means comprises a section of optical fiber.

22. The arrangement of claim 18 wherein the polarization scrambling means comprises a piezoelectric transducer.

23. The arrangement of claim 19 wherein the receiving means comprises a balanced receiver.

24. The arrangement of claim 23 wherein the balanced receiver comprises a PIN-FET balanced receiver.

* * * * *